United States Patent Office 3,530,067
Patented Sept. 22, 1970

3,530,067
METHOD OF TREATING SEWAGE
Louis D. Friedman, New Brunswick, N.J., assignor to FMC Corporation, a corporation of Delaware
No Drawing. Filed June 6, 1968, Ser. No. 734,856
Int. Cl. C02c 1/40
U.S. Cl. 210—15
8 Claims

ABSTRACT OF THE DISCLOSURE

The process of this invention deals with the treatment of sewage to produce a sludge of improved settling characteristics. In the illustrative embodiment, a mixed liquor in addition to being aerated has hydrogen peroxide added to it incrementally or continuously during the aeration operation. The hydrogen peroxide-treated mixed liquor is withdrawn to a settling tank where the sludge can be settled in 15 minutes to 30 minutes.

---

This invention relates to a process for the treatment of sewage. More particularly, it relates to a process for converting the water-insoluble solids of sewage to a rapidly settleable form. Still more particularly, it relates to treatment of sludges such as are formed in the aerated mixed liquor of an activated sludge process with hydrogen peroxide to produce a sludge of fast settling character.

Briefly, the process of this invention comprises passing oxygen-containing gas through an aqueous waste material containing solid and soluble organic matter, said aqueous waste material being maintained at a temperature less than 100° C., adding hydrogen peroxide to said aqueous material during the period of passing gas containing oxygen therethrough, in quantities to maintain a continuing hydrogen peroxide activity during said period of passage of gas, withdrawing said hydrogen peroxide treated aqueous waste material and separating the residual water-insoluble solids therefrom.

Treatment of waste materials such as sewage has as its purposes, elimination of organic material, preferably in the form of non-putrescible matter and the production of aqueous mediums of such quality that their discharge will have little or no adverse effect on the receiving body of water. Processing of waste material such as sewage vary from primary treatment designed to separate water-insoluble solids from the aqueous medium to treatments such as anaerobic digestion of primary sludge, activated sludge type secondary treatments involving aerobiosis, etc. The products of the treatments may be disposed of directly or in the case of digestion products or products of secondary treatments may be subjected to separation to recover a solids concentrate for disposal as desired.

Separating the insoluble solids from aqueous medium in any of the treatment methods is always a delicate operation because primary treatment solids, digested sludge and sludges are at best slow settling materials and tend to remain in suspension unless quiescent conditions are maintained. In addition, changes in the character of the materials entering a sewage treatment plant can markedly alter the effectiveness of settling. The changes in materials entering a sewage treatment plant also are often reflected in the secondary treatments by reduced elimination of B.O.D. and formation of sludges with a high sludge volume index (SVI). When conditions are such that the products of treatment are of a quality which mitigates against their disposal in the conventional way, such products must be subjected to an after treatment. For example, in the case of so-called supernatants obtained by settling the contents of digester tanks, the supernatant is returned to the system for further treatment.

One form of after treatment suggested is to add hydrogen peroxide to effluents being discharged from a secondary treatment unit as a substitute for chlorination for its effect as a disinfectant or odor eliminator. Such treatment renders viable organisms harmless and temporarily overcomes odor.

Now, it has been discovered that the presence of hydrogen peroxide in an aqueous waste medium which is being aerated by passage of oxygen-containing gas therethrough, in quantities to maintain $H_2O_2$ activity during the entire period of aeration, will result in the production of water-insoluble solids which have an accelerated rate of settling and insure, with reasonable operating practices that effective settling can be accomplished and an effluent recovered of improved quality.

More in detail, in one embodiment, the invention comprises the steps of heating anaerobically digested sludge to a temperature in the range between about 60° C. and 100° C., passing oxygen-containing gas through said sludge for a period of one quarter hour to three hours depending upon the weight percent of total solids in the sludge being aerated, adding hydrogen peroxide to said sludge being aerated periodically, for example, every fifteen minutes or continuously, for example, by adding $H_2O_2$ solution of 30% $H_2O_2$ concentration in metered amounts during the aeration period, and settling the resultant mixture.

In another embodiment of the invention, as applied to the activated sludge process, mixed liquor being aerated which may have a temperature in the range between about 10° C. and 75° C., prior to settling or subsequent to a concentration step may be treated, with or without adjustment of temperature to the preferred range of 20° C. to 30° C., through further aeration and addition of hydrogen peroxide prior to withdrawal of the mixed liquor to the final settler.

In still other embodiments such as treatment of sludge from a primary settler or treatment of so-called supernatant from anaerobic or aerobic digesters, the material to be treated is heated to the desired temperature and then hydrogen peroxide is added and the resultant aqueous medium is allowed to settle prior to any subsequent processing.

The length of time an aqueous waste containing organic matter is to be aerated depends upon the total solids content of the aqueous waste being treated and the B.O.D. removal desired. Sludge streams from settlers for anaerobic or aerobic treatment of wastes which are low in solids and have a total solids content by weight of less than 0.6%, may require treatment of less than 15 minutes duration. On the other hand, a sludge concentrate recovered by settling primary or anaerobically digested sludge which may have a solids content in the range of 3% to 6%, may require 3 to 4 hours of combined aerating and hydrogen peroxide treatment.

Combined aerating and hydrogen peroxide treatment may also be applied to sludge concentrates, generally containing less than 3% total solids, which are recoverable as a product of aerobic treatments such as the activated slugde process. Such sludges may require only 1 to 2 hours of treatment. However, since aeration of mixed liquor occurs for periods, generally of 1 to 6 hours, although treatments for as long as 24 hours are not uncommon in extended aeratin processes, in an activated sludge type sewage treatment process, hydrogen peroxide may be added to the mixed liquor during part of the aeration period rather than to the sludge concentrate. This treatment of the mixed liquor generally will be reflected, in a period of two to three hours, in a shrinkage in the bulk of the sludge as evidenced by a lowering of the interface level between clarified liquor and the sludge blanket. After continued use of hydrogen peroxide in the mixed liquor aeration tank, the settled sludge may show a sludge volume reduction of 35% to 75% over that obtained for the normal sludge in a corresponding settling time, say of 15 minutes.

The amount of peroxide required to effect a change in the character of the sludge being handled depends upon the solids content of the waste material being treated. In general, between about 0.3 and 1.2 grams of $H_2O_2$ is required per 10 grams of solids, i.e., the added peroxide by weight required is between 3% and 12% of the total weight of solids in the waste material.

The invention will be further understood from the following examples which are given by way of illustration and without any intention that the invention be limited thereto.

EXAMPLE I

A sewage, after the conventional degritting, comminuting, primary settling, etc., having a B.O.D. content of 200 mg./liter, was split into four portions for aerobic treatment, i.e., aeration and settling.

Basically, the treatment of each portion was that of a conventional activated sludge process. Each portion of influent sewage was mixed with recycle sludge in quantities to produce a solids concentration in the mixed liquor of 1500 p.p.m. and aerated for 3 hours.

Portion A was treated as described in the foregoing paragraph. The mixed liquor containing portion B had added to it at the start of the aeration period, 24 ml. of 30% hydrogen peroxide solution per 10 grams of solids. 30% hydrogen peroxide solution was added to the mixed liquor-containing portion C by introducing 4 ml. every 30 minutes. 30% $H_2O_2$ solution was added to the mixed liquor-containing portion D, continuously in a dropwise manner to incorporate a total of 24 ml. per 10 grams of solids over the 3 hour aeration period.

The sludge volume after settling the aerated mixed liquor for 15 minutes was as follows:

|  | A | B | C | D |
|---|---|---|---|---|
| 1 hour aeration | 48 |  | 22.5 | 9.5 |
| 2 hour aeration | 48 | 46.5 | 27.0 | 6.5 |
| 3 hour aeration |  | 47.0 | 22.0 | 13.0 |

EXAMPLE II

The effect of varying the amount of $H_2O_2$ in the combined aeration and hydrogen peroxide treatments is illustrated with reference to the treatment of samples of mixed liquor identified as portions E, F and G.

300 cc. portions of mixed liquor were treated in stoppered flasks. Each portion was agitated by passage of air therethrough at a rate of 0.5 liter per minute, a rate sufficient to create agitation. Portion E had no $H_2O_2$ added to it. Portions F and G had 30% $H_2O_2$ solution added to them dropwise at a rate introducing 1 ml. per hour and 2 ml. per hour, respectively.

At the end of each hour, a sample of sludge was withdrawn and settled for 15 mm.

Results were as follows:

SETTLING ACTIVITY OF 30% $H_2O_2$ ON MIXED LIQUOR AT ROOM TEMPERATURE
0.5 liter air/min. 300 cc. sludge

|  | E | F | G |
|---|---|---|---|
| 30% $H_2O_2$ added, ml./hour | None | 1.0 | 2.0 |
| Sludge Vol. percent after 15 min settling |  |  |  |
| $H_2O_2$ treating time, hrs.: |  |  |  |
| 1 | 40 | 38 | 40 |
| 2 | 40 | 38 | 40 |
| 3 | 40 | 32 | 18 |

EXAMPLE III

The influence of temperature upon the effectiveness of the combined aeration and hydrogen peroxide treatment is illustrated with reference to treatment of portions of mixed liquor identified as H, I, J, K and L.

300 cc. portions of mixed liquor were treated in stoppered flasks. Each portion was agitated by passage of air therethrough at a rate of 0.5 liter per minute. Portion H was maintained at 25° C. and no $H_2O_2$ was added. Portion I was maintained at 40° C. and no $H_2O_2$ was added. Portion J was maintained at 60° C. and no $H_2O_2$ was added. Portion K was maintained at 40° C. and 30% $H_2O_2$ was added in 1 ml. quantities every 30 minutes. Portion L was maintained at 60° C. and 30% $H_2O_2$ was added ni 1 ml. quantities every 30 minutes.

At the end of each hour, a sample of sludge was withdrawn and settled for 15 minutes.

Results were as follows:

|  | H | I | J | K | L |
|---|---|---|---|---|---|
| Temp., ° C | 25 | 40 | 60 | 40 | 60 |
| 30% $H_2O_2$, added, ml./hour | None | None | None | 1 | 1 |
| Sludge vol. percent after 15 min. settling |  |  |  |  |  |
| Treating time, hrs.: |  |  |  |  |  |
| 1 | 50 | 46 | 36 | 16 | 16 |
| 2 | 50 | 42 | 36 | 16 |  |
| 3 | 44 | 36 | 36 |  | 18 |

EXAMPLE IV

Sludge withdrawn from an area near the bottom of an anaerobic digester from solids accumulated in a primary settler of raw sewage, was divided into portions N, O and P.

The sludge was maintained at approximately 60° C. by heating in an electric mantle. Portion N was agitated by passing air therethrough at a rate of 0.5 liter per minute and no $H_2O_2$ was added. Portion O was agitated using the same amount of air and 30% $H_2O_2$ solution was added in 2 ml. quantities per 5 grams of solids present every 30 minutes. Portion P was agitated using the same amount of air and 30% $H_2O_2$ was added dropwise at a rate introducing 4 ml. per 5 grams of solids present per hour.

At the end of each hour, a sample of sludge was withdrawn and settled for 15 minutes.

Results were as follows:

|  | N | O | P |
|---|---|---|---|
| Temp., ° C | 60 | 60 | 60 |
| Ml. 30% $H_2O_2$, added 5 grams of solids/hr | 0 | 2 | 4 |
| Sludge Vol. percent after 15 min. settling |  |  |  |
| Treating time, hrs.: |  |  |  |
| 2 | 100 |  | 100 |
| 3 | 100 |  | 92 |
| 4 | 98 | 48 | 52 |

Waste entering a treatment system may vary widely in pH depending upon the nature of the waste components.

Sludge produced by aerobic treatment and by anaerobic treatment of such wastes may or may not vary in pH more than the influent waste depending upon the susceptibility of the waste components influencing pH, to oxidation, etc., which will alter the acidic nature of the aqueous treated material. Generally, domestic sewage will have a pH in the range between 5 and 7. An anaerobically digested sludge which is produced by treating primary sludge settled from said domestic sewage may have a pH in the range between 6.7 and 7.4. An aqueous sewage discharged from a secondary settler, after aerobic treatment in the mixed liquor of an activated sludge process, may have a pH in the range between 7 and 8.

A mixed liquor when acidified to a pH of 3.3 with sulfuric acid or 3.2 with hydrochloric acid when 30% hydrogen peroxide is added dropwise at a rate of 1 cc. per 15 minutes, after 30 minutes of treatment as described in Example I shows a sludge volume reduction for the slurry of 3.3 pH, from 30% to 7% and for the slurry of 3.2 pH, from 30% to 14%. In the case of the latter, continuing the treatment for a total of 45 minutes so that the H₂O₂ added totaled 3 cc., resulted in a final sludge volume of 8%. If at the time of hydrogen peroxide treatment, the solution is strongly acidic, the resultant sludges may require pH adjustment to the above-discussed pH levels prior to subsequent processing.

Digested sludges of up to about 7.5% solids concentration react more slowly with hydrogen peroxide and require a higher temperature for effective reaction than sludges of 3% to 4% solids concentration obtained as a result of activated sludge type sewage treatments. A temperature in the range between about 60° C. and 80°. C, generally is preferred for treatment of, for example, sludge obtained from an anaerobic digester. At these higher temperatures, the efficiency of utilization of hydrogen peroxide is enhanced, since consumption of hydrogen peroxide was reduced as much as 50% when the pH of the digested sludge was adjusted from 6.8 to 2.3.

The above-detailed description of this invention has been given by way of illustration without any intention that the invention be limited to the exact conditions set forth. No unnecessary limitations should be understood therefrom, as modifications will be obvious to those skilled in the art.

I claim:

1. A sewage treatment process comprising maintaining an aqueous waste material containing organic matter at a temperature between ambient temperature and 100° C., passing oxygen-containing gas through said aqueous material, for a period of up to 6 hours, admixing hydrogen peroxide with said aqueous material during the period of passing gas therethrough in quantities to maintain a continuing H₂O₂ activity in the aqueous material during said period of passage of gas, withdrawing said H₂O₂ treated aqueous material and separating the solid matter therefrom.

2. A process according to claim 1 wherein said aqueous material is mixed liquor of an activated sludge process and the hydrogen peroxide is added continuously during the aeration period.

3. A process according to claim 1 wherein said aqueous material is mixed liquor of an activated sludge process and the hydrogen peroxide is added periodically during the aeration period.

4. A process according to claim 1 wherein the hydrogen peroxide is added during the latter stages of aeration of the mixed liquor.

5. A process according to claim 1 wherein said aqueous waste material is digested sewage sludge and includes the added step of heating said digested sewage sludge to a temperature in the range between 60° C. and 100° C.

6. A process according to claim 1 in which the pH of the aqueous waste material to be treated is adjusted to between about 2.3 and 3.5 before adding H₂O₂.

7. A process according to claim 1 wherein the aqueous waste material is concentrated sludge from a sewage treatment process having a solids concentration in the range between about 3% and 7.5%.

8. A process according to claim 1 wherein the aqueous waste material is mixed liquor discharged from the aeration stage of an activated sludge process.

References Cited

UNITED STATES PATENTS 2,576,442   11/1951   Borglin et al. _____ 210—63 X

JAMES L. DeCESARE, Primary Examiner

U.S. Cl. X.R.

210—18, 59

PO-1050
(5/69)

UNITED STATES PATENT OFFICE
CERTIFICATE OF CORRECTION

Patent No. 3,530,067              Dated September 22, 1970

Inventor(s) Louis D. Friedman

It is certified that error appears in the above-identified patent and that said Letters Patent are hereby corrected as shown below:

Column 3, line 68, "38" should be -- 34 -- ; same line "40" should be -- 30 -- .

Column 4, line 10, "ni" should be -- in -- .

SIGNED AND
SEALED
DEC 15 1970

(SEAL)
Attest:

Edward M. Fletcher, Jr.
Attesting Officer

WILLIAM E. SCHUYLER, JR.
Commissioner of Patents